No. 678,720. Patented July 16, 1901.
D. MacK. B. H. COCHRANE.
TEA OR COFFEE POT.
(Application filed Mar. 5, 1901.)
(No Model.) 2 Sheets—Sheet 1.
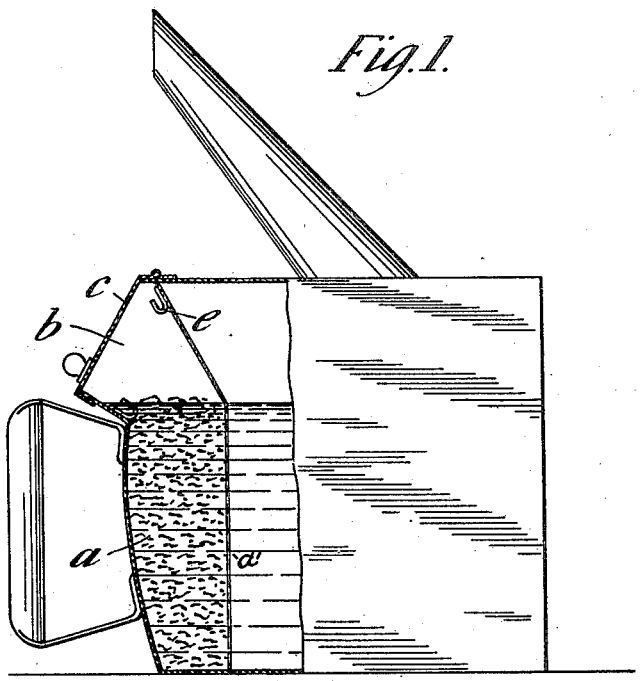
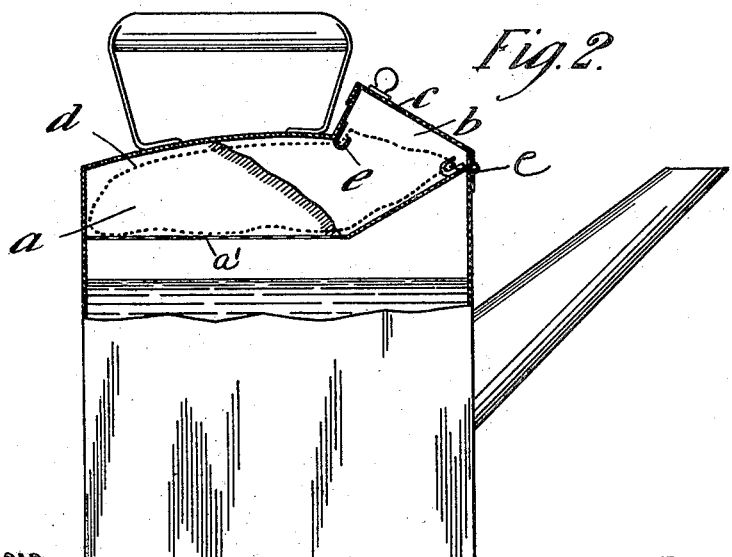

No. 678,720. Patented July 16, 1901.
D. MACK. B. H. COCHRANE.
TEA OR COFFEE POT.
(Application filed Mar. 5, 1901.)
(No Model.) 2 Sheets—Sheet 2.
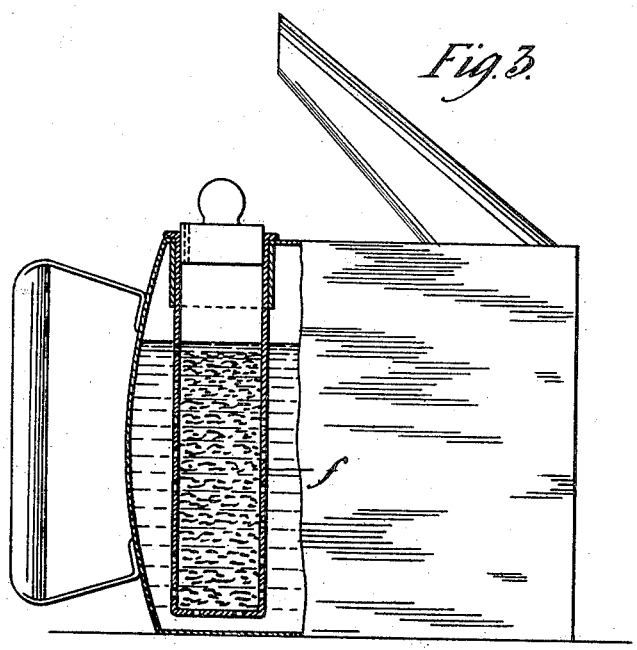
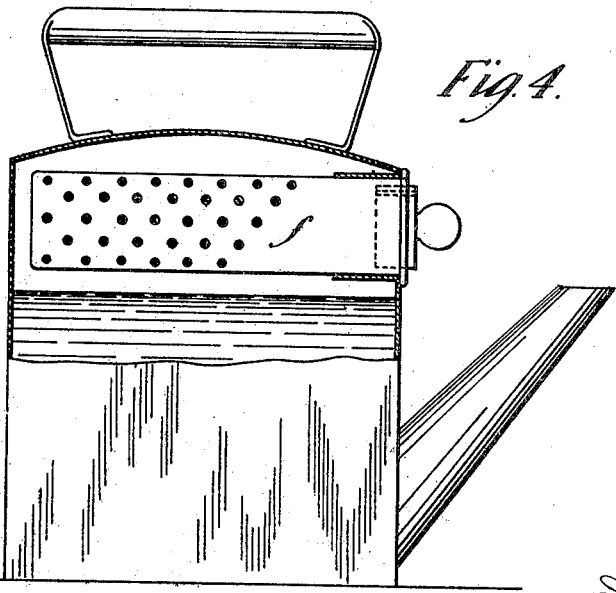

UNITED STATES PATENT OFFICE.

DOUGLAS MacKINNON BAILLIE HAMILTON COCHRANE, OF LONDON, ENGLAND.

TEA OR COFFEE POT.

SPECIFICATION forming part of Letters Patent No. 678,720, dated July 16, 1901.

Application filed March 5, 1901. Serial No. 49,853. (No model.)

*To all whom it may concern:*

Be it known that I, DOUGLAS MACKINNON BAILLIE HAMILTON COCHRANE, Earl of Dundonald, a citizen of England, residing at 34 Portman Square, London, England, have invented a certain new and useful Improvement in Tea or Coffee Pots, (for which I have applied for a patent in Great Britain, dated January 28, 1901, No. 1,926,) of which the following is a specification.

In making tea and coffee it is desirable that the water should extract just so much of the aromatic constituents of the leaves or berries as the drinker may require and that when the infusion is made it should not remain in contact with the leaves or berries, thereby giving it a coarse flavor and in many cases producing a liquid harmful to the drinker. It is also often desirable to have a pot that can be used as a teapot, as a coffee-pot, or as a kettle.

My invention relates to the construction of a pot in such a manner that the infusion is separated from the tea-leaves or berries whenever required and that the water can also be boiled in the same pot as that in which the infusion is made. For this purpose I make the pot of such a shape that it will stand either on its bottom or on the end opposite the spout and provide for the separation of the liquid infusion from the tea-leaves or coffee, as I shall describe, referring to the accompanying drawings.

Figures 1 and 2 are elevations, partly sectional, showing a pot according to my invention in its two positions; and Figs. 3 and 4 are similar figures showing a modification.

As shown in Figs. 1 and 2, I provide a compartment *a*, having a perforated side or sides, as at *a'*, which may be wire-gauze or perforated metal, and having an opening *b*, which may be provided with a lid *c*. Standing the pot on its end, as shown in Fig. 1, I charge the compartment *a* with the tea-leaves or coffee, which may be contained in a muslin or other pervious bag *d*, suspended from hooks *e*. I then pour the hot water through the leaves or coffee into the pot and immediately or after such time as may be preferred I turn the pot so that it stands on its bottom, as shown in Fig. 2, in which position the liquid infusion is separated from the tea-leaves or coffee and can be poured from the spout in the usual way.

According to the modification shown in Figs. 3 and 4 the pervious compartment *f* instead of forming part of the pot may be a separate vessel supported in the pot and capable of withdrawal for cleaning. In this case it may be made of porcelain or earthenware.

Obviously pots made as above described might be employed for simply heating or boiling liquids without effecting infusion. Also when infusion is to be made instead of heating the water in a separate utensil the tea-leaves or coffee may be placed in the compartment *a* or *f*, and the water boiled in the pot itself while it stands on its bottom can be brought in contact with the tea or coffee by turning the pot on end for such time as may be desired, after which it can be again turned on its bottom.

Having thus described the nature of this invention and the best means I know for carrying the same into practical effect, I claim—

1. A coffee or tea pot, consisting of a vessel adapted to stand upon its bottom or side and to contain a liquid, and a pervious compartment arranged at the top of the vessel and adapted to be clear of the liquid when the vessel stands upon its bottom.

2. A coffee or tea pot, consisting of a vessel adapted to stand on one side or its bottom, a pervious compartment arranged in said vessel and communicating with an inlet therefor in the side opposite the side on which the vessel stands and means for closing said inlet.

3. A coffee or tea pot, comprising a vessel adapted to stand on its side or bottom, a pervious compartment arranged in the top portion of the vessel, and means engaging one side of said vessel to permit of access to said compartment.

In testimony whereof I have hereunto set my hand in presence of two subscribing witnesses.

DOUGLAS MACKINNON
BAILLIE HAMILTON COCHRANE.

Witnesses:
OLIVER INNALL,
GERALD L. SMITH.